United States Patent [19]

Mendenhall

[11] Patent Number: 4,726,527
[45] Date of Patent: Feb. 23, 1988

[54] DRIP IRRIGATION EMITTER

[76] Inventor: Edward V. Mendenhall, 43 Margarita, Camarillo, Calif. 93010

[21] Appl. No.: 882,704

[22] Filed: Jul. 7, 1986

[51] Int. Cl.⁴ .............................................. B05B 15/00
[52] U.S. Cl. ................................... 239/542; 239/600; 285/200
[58] Field of Search ...................... 239/533.1, 542, 562, 239/570, 572, 588, 600; 285/200, 198; 137/883, 513.5, 877

[56] References Cited

U.S. PATENT DOCUMENTS

| 3,552,436 | 1/1971 | Stewart | 137/883 |
| 3,767,124 | 10/1973 | Spencer | 239/542 |
| 3,814,377 | 6/1974 | Todd | 239/542 |
| 3,873,031 | 3/1975 | Reeder et al. | 239/542 |
| 3,926,375 | 12/1975 | Reeder et al. | 239/542 |
| 4,226,368 | 10/1980 | Hunter | 239/542 |
| 4,381,764 | 5/1983 | Wojcik | 285/192 |

FOREIGN PATENT DOCUMENTS 1494223  7/1966  France ................ 285/192

Primary Examiner—Andres Kashnikow
Assistant Examiner—Michael J. Forman
Attorney, Agent, or Firm—Jack C. Munro

[57] ABSTRACT

A drip irrigation emitter which is constructed of a tubular housing within which is located an internal chamber. A pressurized source of water is to be supplied to the internal chamber which is divided into a plurality of valve chambers. Within each valve chamber is mounted a ball. The ball is to be movable due by the water pressure to engage a valve seat. Formed within the valve seat are a plurality of minute flow passages through which the water is to seep or trickle into a closed chamber with therebeing a separate closed chamber for each valve seat. The closed chambers are formed within a cover, a separate distribution conduit is connected to each closed chamber through which the water is conducted to be deposited at an exterior location. Each of the distribution conduits is passed through a separate opening formed within the cover. The cover is fixedly mounted onto the housing. The cover prevents any sharp bend or "kink" occurring in the distribution conduit and minimize the entry of foreign material in contact with the upper end of the housing.

4 Claims, 7 Drawing Figures

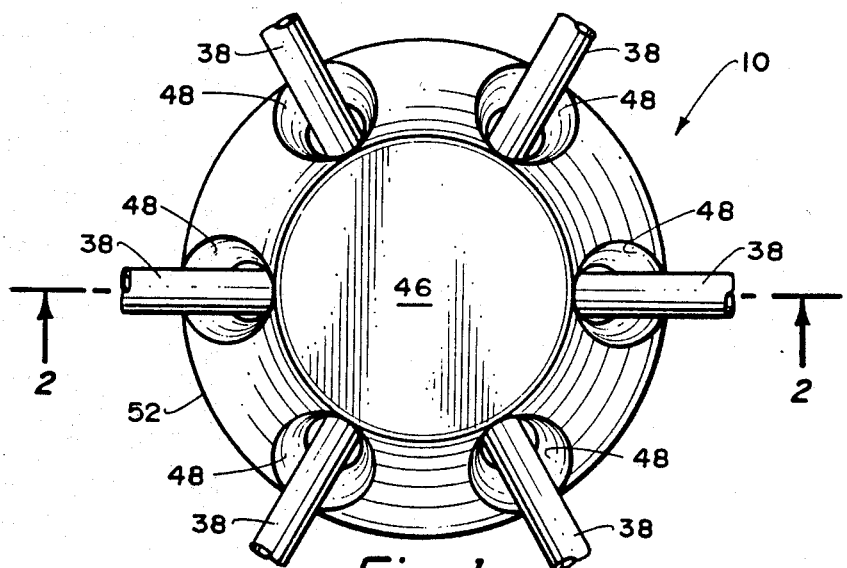
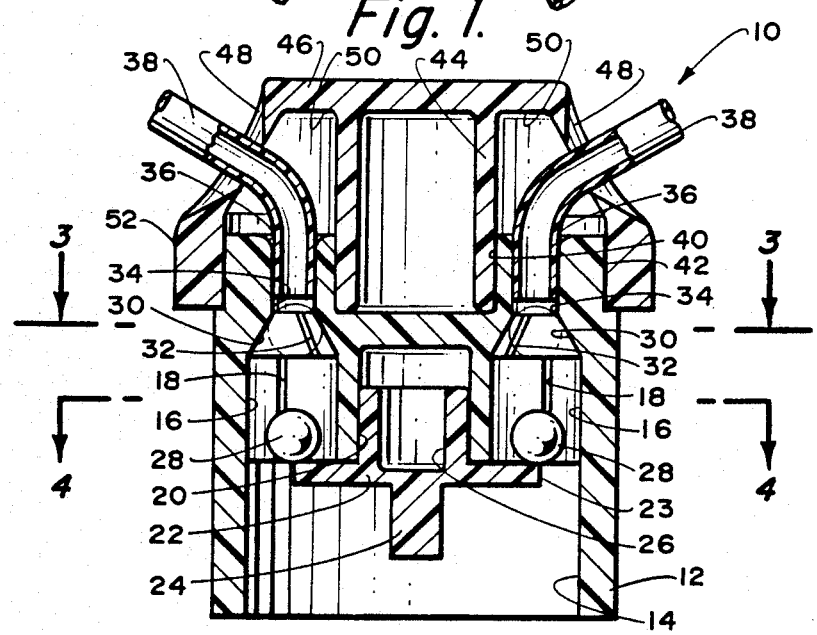
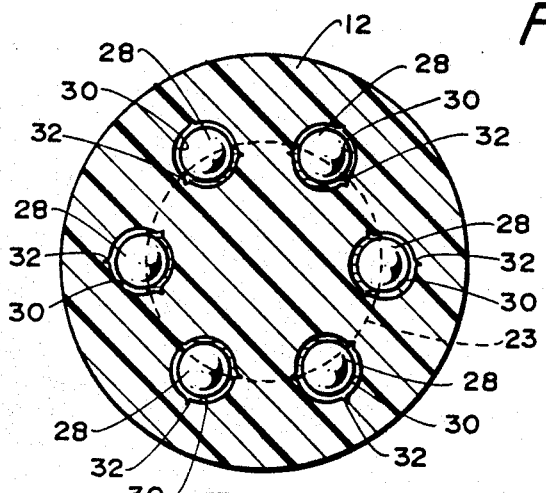
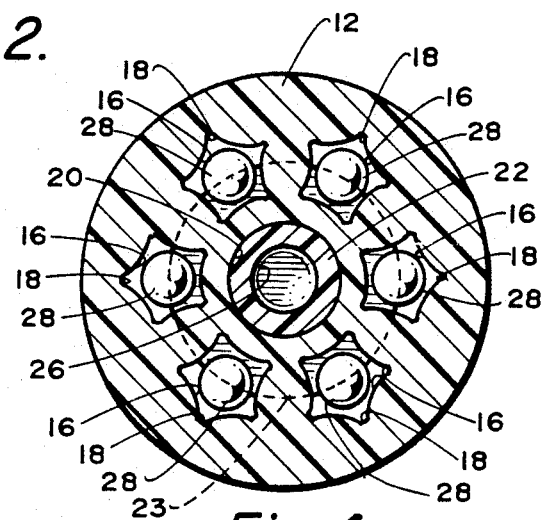

DRIP IRRIGATION EMITTER

REFERENCE TO PRIOR APPLICATION

This patent application is similar to patent application Ser. No. 755,722, filed 7/17/85, entitled "Drip Irrigation Emitter Apparatus", by the same inventor, now abandoned.

BACKGROUND OF THE INVENTION

The field of this invention relates to irrigation equipment and more particularly to irrigation equipment that provides for drip irrigation of trees, shrubs or the like.

Irrigation is the artificial watering of crops so that they achieve their full potential growth. Probably the oldest method of irrigation is flooding. Flooding comprises drenching a large quantity of water on a given area and having this occur at certain time intervals until the crop is ready to be harvested. Another method of irrigation is to use overhead sprinklers from which the water fall is sprayed like rain.

The main disadvantage to both flooding and sprinkling as a form of irrigation is that no effort is made to conserve the water. In recent year it has been found that the same crop yield can be obtained through the use of distributing of a small continuous flow of water directly to the base of the tree or shrub. This small continuous flow of water is what is frequently referred to as "drip irrigation". Drip irrigation is achieving much success in the arid areas of the world where there are limited supplies of irrigation water. Drip irrigation provides for frugal use of a limited water supply.

In the utilizing of any drip irrigation system, it is necessary to utilize some sort of valve which will cause only a very limited amount of water to be discharged through the distribution conduit to the plants that are to be irrigated. These valves, in the past, have taken numerous types of configurations. Common forms of such valves of the past have worked on the principle of a screen through which only a limited quantity of water was permitted to pass, or by capillary action, or by using a flexible diaphragm within which are formed one or more small orifices. Screens easily become clogged with foreign material. Also, the same is true for capillary tubes. Not only are th diaphragms subject to clogging, but also they are known to deteriorate rapidly upon being subjected to chemicals such as fertilizers, chlorine acid and pesticides.

Because of the deficiencies of the aforementioned types of irrigation equipment, there has recently evolved a different type of emitter which works on the basis of a ball check valve. Reference is to be had to U.S. Pat. Nos. 3,746,263, 3,926,374, 3,894,688, 3,873,031, and 3,926,375 in which irrigation equipment is shown which utilizes the ball check valve in order to achieve drip irrigation. However, one of the disadvantages of the ball check valve type of drip irrigation equipment of the prior art is that each emitter only distributes water to a single distribution conduit. If a single emitter could be utilized to distribute water to a plurality of distribution conduits, the cost of installation of such equipment could be decreased since only one emitter would be required instead of a plurality of different emitters. Also, it is possible with prior art ball check valve type of emitters, that the distribution conduit could be "kinked". A kinking of a distribution conduit, when dealing with the very limited pressure of a drip irrigation system, will result in stopping of the flow of the water. Additionally, prior art emitters were not designed to easily replace existing failed equipment.

SUMMARY OF THE INVENTION

A drip irrigation emitter which is designed to connect with a plurality of drip irrigation distribution conduits. Each distribution conduit is conducted through an opening formed within a cover. Each drip irrigation line then connects with a separate outlet passage formed within a housing. The use of the cover prevents each distribution conduit from kinking. Each outlet passage is slightly enlarged and smoothly contoured at their outermost edges to facilitate the connection with its respective distribution conduit. Each outlet passage is then connected to a valve seat which includes a plurality of minute flow passages. Each valve seat connects with a separate valve chamber. Within each valve chamber is located a spherical valve member. The valve members are held captive within their respective valve chambers by means of a flanged plug which is fixedly mounted to the housing. Each valve chamber is formed to include a plurality of inwardly extending arcuate flutes. Valve chambers directly connect to an internal chamber of the housing. The internal chamber of the housing is in turn connected to a source of pressurized water. A modified form of this emitter requires only that each distribution conduit be inserted into a separate opening in the cover not requiring connection with an outlet passage.

The primary objective of the present invention is to provide an improved irrigation emitter apparatus which embodies a plurality of independent, flow responsive, valves to provide for a continuous low, steady rate of flow of water to irrigate a plant positioned exteriorly of and spaced from the emitter.

Another objective of this invention is to construct an emitter which minimizes the possibility of kinking which will cause complete blocking of the outlet distribution conduits which are connected directly to the emitter.

Another objective of this invention is to construct an emitter to be of a non-corrosive material which is not affected by chemicals.

Another objective of this invention is to construct an emitter of few parts which can be easily and quickly assembled together which would permit the emitter to be sold at minimal cost to the ultimate consumer.

BRIEF DESCRIPTION OF THE DRAWINGS

FIG. 1 is a top plan view of the drip irrigation emitter of the present invention showing the emitter as it would appear in its installed condition;

FIG. 2 is a cross-sectional view taken through the drip irrigation emitter of the present invention taken along line 2—3 of FIG. 1;

FIG. 3 is a cross-sectional view of the drip irrigation emitter of the present invention taken along line 3—3 of FIG. 2 showing in more detail the valve seat arrangement which produces the limited volume of flow of water from the emitter;

FIG. 4 is a cross-sectional view taken along lin 4—4 of FIG. 2 showing in more detail the valve chambers that are ulilized in conjunction with the valve seats;

DETAILED DESCRIPTION OF THE SHOWN EMBODIMENT

Figure 5:
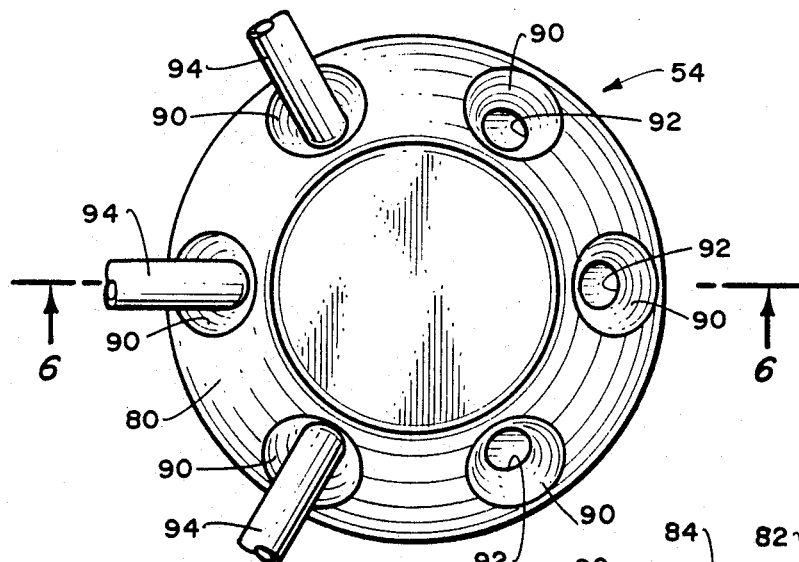
FIG. 5 is a top plan view of a modified form of drip irrigation emitter of this invention again showing the emitter as it would appear in the installed condition.

Referring particularly to the drawing, there is shown the drip irrigation emitter 10 of this invention which has as its primary basic component a tubular housing 12 which has an internal chamber 14. The housing 12 will normally be constructed of a plastic material as is also the case for each of the parts of the emitter 10 with the exception of any parts specifically noted otherwise. The reason plastic material is desirable is that it is not corrosive. Typically, the emitter 10 will be located at or below ground surface. Therefore, the emitter 10 will be subject to continuous moisture which would easily cause rusting of the emitter 10 is such were constructed of a metallic material.

Formed within the housing 12 and located within the internal chamber 14 are a plurality of valve chambers 16. There are actually shown six in number of valve chambers 16. However, it is to be considered within the scope of this invention that there could be utilized a greater or lesser number of valve chambers 16 without departing from the scope of this invention.

Each of the chambers 16 in cross-section resembles the shape of a five pointed star. Each wall of the star is convex with respect to the center of each chamber 16. The convex walls result in the producing of grooves 18 between directly adjacent walls. This type of configuration is generally termed "an arcuate flute", and the reason for this will be explained further on in this specification.

Within the housing 12 there is centrally formed a recess 20. Tightly mounted within the recess 20 is a plug 22. The plug 22 has extending laterally therefrom an annular flange 23. In order to assist in locating of the plug 22 in position within the recess 20, there is attached to the plug a graspable protuberance 24. Also formed within the plug 22 is a recess 26 which is solely for the purpose of decreasing the mold time during manufacturing of the plug 22.

Located within each of the valve chambers 16 is a steel ball 28. Each of the steel balls 28 is of a size to be loosely positioned between the arcuate flutes of the valve chamber 16. The annular flange 23 prevents the balls 28 from being dislodged from the valve chambers 16 at the lower end thereof. At the upper end of each valve chamber 16 there is formed a conical valve seat 30. The size of the conical valve seat 30 is so that each ball 28 is capable of snugly resting against the valve seat 30 substantially closing its respective outlet passage 34. Actually, the outlet passages 34 would be closed with the exception that there is formed minute passages 32 (three in number being shown for each valve seat 30) which will permit flow of water from the valve chambers 16 into the outlet passages 34 even with the balls 28 in snug contact with their respective valve seats 30. Typically, these passages 32 will be of a depth of five to eight mils in order to achieve a flow capacity from one to three gallons per hour through each outlet passage 34 when the walls 28 are seated against the valve seat 30. It should be understood that by varying the depth of the passages 32, the volume of flow through each outlet passage 34 can therefore be varied.

Snugly located within each outlet passage 34 is the inner end of a distribution conduit 38. The distribution conduits 38 will normally be constructed of a rubber or plastic material and is for the purpose of moving the flow of the water from the respective outlet passage 34 to be deposited at an exterior location from the emitter 10 which generally would be the base of a tree or shrub. It can be seen that by observing FIG. 1 of the drawing, that the conduits 38 extend in different directions resembling the spokes of a wheel. In usage, the emitter 10 will be centrally located with respect to six in numbe of trees or shrubs with a single conduit 38 to extend to a particular tree or shrub. In order to facilitate physical insertion of the conduit 38 within the outlet passage 34, the outer edge of each outlet passage 34 is enlarged to form an annular, smoothly contoured, wall surface 36.

Also formed within the upper end of the housing 12 and centrally positioned relative to the outlet passages 34 is a recess 40. Formed within the periphery of housing 12 at the upper end thereof is an annular recess 42. An annular protrusion 44 of a cover 46 is to be snugly located within the recess 40. Also, the annular edge 52 of the cover 46 is tightly held onto the annular recess 42. One of the functions of the cover 46 is to minimize the contact of the housing 12 by foreign material.

Exterior access for each of the distribution conduits 38 must be provided through the cover 46. This exterior access for each distribution conduit 38 is achieved by forming of an opening 48 for each conduit 38 within the cover 46. Each of the openings 48 is positioned within the cover 46 so that each distribution conduit 38 makes a substantially right angled bend after it extends from their respective outlet passage 34. There is formed within the interior of the cover 46 a compartment 50 directly adjacent each opening 48. A distribution conduit is to be conducted through a compartment 50 prior to extending through the opening 48. The side wall of the opening 48 is positioned so as to minimize the possibility of kinking of the distribution conduit 38. Kinking of conduit 38 will result in blockage of the flow through the conduit 38 principally because the force of flow of the water is minimal that is being conducted through each conduit 38.

The arcuate fluted shape of each of the valve chambers 16 is for the following purposes: Grooves 18 provide increased area about the ball 28 so that when the ball 28 is not positioned against the seat 30, significantly increased flow of water from the internal chamber 14 is conducted about the ball 28 than would be possible if the valve chamber 16 was concentric with the ball 28. This increased flow produces a surge of water through the valve chamber 16 into the outlet passage 34. There is always a possibility that some type of foreign material, such as vegetation, insect bodies or dirt, can become lodged within the valve chamber 16 in the area of the valve seat 30 which could significantly decrease flow of the water through the distribution conduit 38. If this is perceived, the individual grasps the particular blocked conduit 38 and squeezes such shut. The individual holds the line shut for a few moments permitting sufficient water to accumulate within conduit 38 to build up sufficient pressure which would result in the ball 28 moving from the dotted line position shown in FIG. 2 to the solid line position. At that particular time the individual releases the conduit 38 which will result in a surge of water about the ball 28 into the conduit 38. Hopefully, this surge will dislodge the foreign material and conduct such through the conduit 38 to be discharged at the end thereof. It is to be understood that this surge is only momentary until the ball 28 is again reseated against the valve seat 30.

Another function of the arcuate flutes of the valve chamber 16 is that, if the wall of the valve chamber 16 was concentric with respect to the ball 28, there would be a possibility that the water would flow about the ball 28 causing the ball to spin and not move against the seat 30. The arcuate fluted wall surface of the valve chamber 16 creates a sufficient turbulent action of the water passing therethrough which diminishes the possibility of the ball 28 remaining stationary and not lodged against the seat 30. In actual practice, upon pressurized water being supplied to the internal chamber 14, the balls 28 are "slammed" against their respective seats 30.

It is to be understood that the housing 12 can be connected by conventional means to the source of water which normally would be a pipe. Conventional means can be screw threads, adhesive or some type of snap removing coupling.

Figure 7:
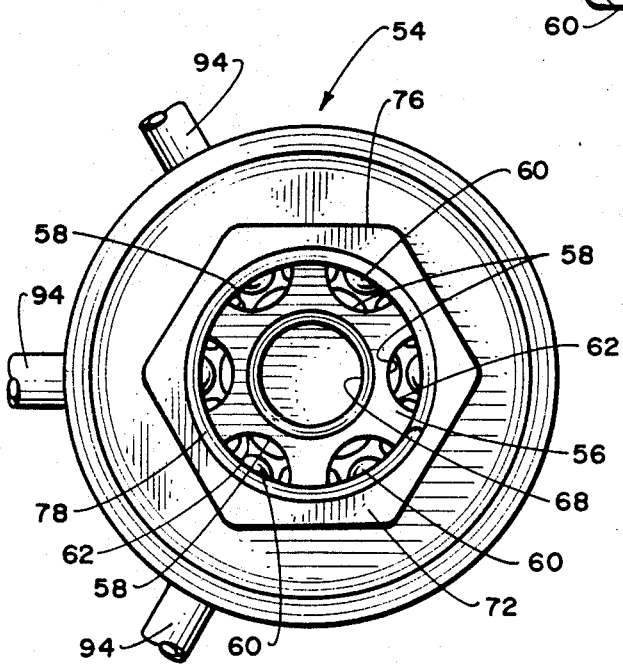
FIG. 7 is a bottom plan view of the drip irrigation emitter of FIG. 5.

Referring particularly to FIGS. 5 and 7 of the drawings, there is shown a modified form 54 of the drip irrigation emitter of this invention. This modified form 54 is basically similar to the drip irrigation emitter 10 in both operation and construction. The emitter 54 defines an inner housing 56 which is basically disc shaped. Within this internal housing 56 is formed a plurality of valve chambers 58 with there being selected six in number of the chambers 58. Within each chamber 58 is located a steel ball 60. The side wall of each valve chamber 58 includes arcuate flutes (five in number for each valve chamber 58) with there being formed a groove 62 between each directly adjacent pair of arcuate flutes. Again, the ball 60 is to be movable into contact with a valve seat 64. Formed within each valve seat 64 are three in number of minute passages 66.

As previously mentioned in relation to FIGS. 1 to 4, when water pressure is applied against the ball 60, each ball 60 will move directly against its valve seat 64. Water then will continue to flow past the valve seat 64 through the minute passages 66. The internal housing 56 includes a central recess 68 which has no function except to eliminate unneeded material during molding.

The inner housing 56 is to be adhesively secured within the enlarged internal chamber 70 of an outer housing 72. When so secured, the upper surface of the internal housing 56 is flush with the upper surface of the outer housing 72. The inner housing 56, when properly installed within the enlarged chamber 70, would rest against a flange 74. Prior to installing of the inner housing 56 within the enlarged chamber 70, the balls 60 are placed within their respective valve chambers 58. The reason for this is that once the inner housing 56 is so installed, the balls 60 are prevented from being removed from their respective valve chamber 70 by means of the flange 74. This flange 74 is formed as part of a sleeve 76. The sleeve 76 has an internally threaded opening 78 which is to facilitate watertight attachment to a source of water such as a pipe (not shown).

Adhesively secured to the upper surface of the outer housing 72 and the upper surface of the inner housing 56 is a cover 80. This cover 80 is basically identical to cover 46. Cover 80 assumes a basic circular configuration. Cover 80 has an enlarged center recess 82 centrally formed therein. The function of the recess 82 is again to eliminate unneeded material during molding. Located about the recess 82 are a plurality of chambers 84. It is to be noted there are six in number of the chambers 84 with a chamber 84 to connect with a valve seat 64. Each chamber 84 is completely enclosed and does not connect to the other chambers 84. The inner end of each chamber 84 has adhesively mounted therein a plug 86. Each plug 86 includes a hole 88. It is to be noted that the hole 88 is offset (not centrally disposed) within the plug 86. Each hole 88 is to directly align with the smallest opening size of its respective valve seat 64. Water is to flow past the valve seat 64 into its respective opening 88 and then into and completely filling its respective chamber 84. Hole 88 functions as a water outlet passage for its respective valve seat 64.

Figure 6:
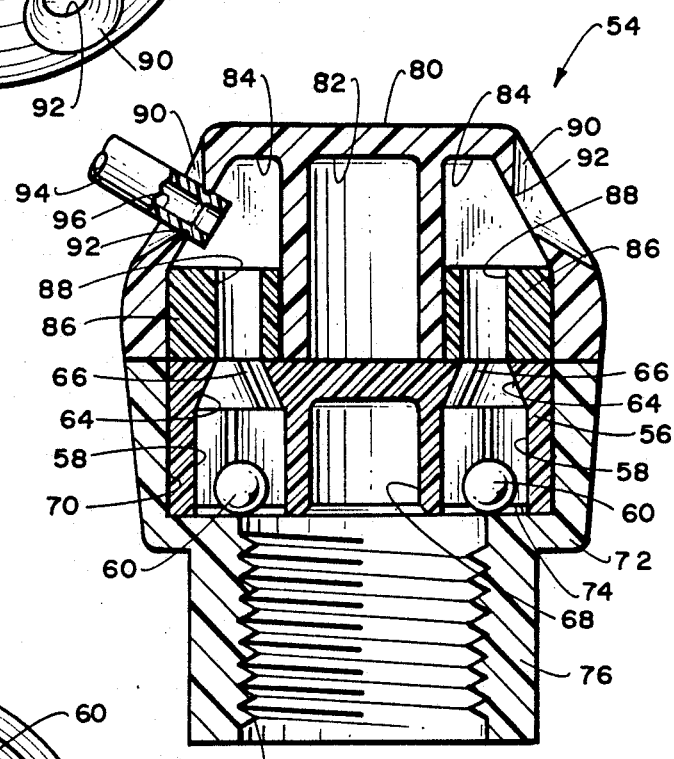
FIG. 6 is a cross-sectional view through the modified form of drip irrigation emitter taken along line 6—6 of FIG. 5.

Connecting with each chamber 84 is a conical shaped recess 90. Each recess 90 is basically identical to previously described openings 48. The inner wall of each recess 90 defines an annular knife edge opening 92. An end of a flexible distribution conduit 94 is to be inserted into the opening 92 and terminate within the chamber 84. The size of the opening 92 is slightly less than the outer diameter of the conduit 94. As the conduit 94 is inserted within the chamber 84, the conduit 94 slides past the knife edge opening 92. With the conduit 94 in position as shown in FIG. 6, if attempt is made to withdraw the conduit 94 from the chamber 84, the knife edge opening 92 will "dig into" the surface of the conduit 94 making it difficult to remove such from the chamber 84. It is to be noted that the knife edge opening 92 is pointed in a direction toward the chamber 84. This pointing of the opening 92 permits the conduit 94 to be easily inserted within the chamber 84 but at the same time makes it difficult to remove the conduit 94.

The water that is conducted through the threaded opening 78 and into the valve chambers 58 will be caused to flow through the minute passages 66, through opening 88 and, of course as previously mentioned, completely fill chambers 84. This water is under a very low pressure and will not be of sufficient pressure to disengage the conduits 94 from their respective openings 92. As a result the water will slowly flow through passages 96 of each distribution conduit 94 to be deposited at a remote location determined by the outer end of the particular distribution conduit 94.

By utilizing of the separate valve chambers 58 and the separate closed chambers 84, if perchance foreign material prevents conducting of water through a conduit 94, the remaining conduits 94 will operate satisfactorily.

What is claimed is:

1. A drip irrigation emitter comprising:

a tubular housing having an internal chamber, said internal chamber terminating at an upper end and a lower end, said lower end to be connectable to a source of pressurized water;

a plurality of valve chambers formed within said tubular housing and located within said internal chamber, each said valve chamber has a valve seat, each said valve seat being located at said upper end of said internal chamber, each said valve seat including at least one minute flow passage, a single said valve chamber connecting with a single said valve seat, a ball mounted within each said valve chamber with there being a separate said ball for each said valve chamber, each said ball being captive within its respective said valve chamber, each said ball being movable between its respective said valve seat to a position spaced from said valve seat, when a said ball is spaced from its respective said valve seat a substantially increased flow of water is permitted through said valve chamber, with a said ball in contact with a said valve seat a reduced flow of water occurs through said minute flow passage, a water outlet passage connected to said valve seat with therebeing a separate said water outlet passage for each said valve seat;

a cover mounted on said housing at said upper end, said cover having a plurality of openings, said cover having a plurality of closed chambers, a said opening providing access from the ambient into a said closed chamber, each said opening defining an annular knife edge wall surface;

a separate distribution conduit connected with each said opening, each said conduit terminating within a said closed chamber, each said conduit having an exterior surface, each said conduit adapted to receive water from its respective said closed chamber and conduct such to be deposited at a point spaced from said tubular housing, said annular knife edge wall surface of each said opening tightly digging into said exterior surface of its respective said distribution conduit; and each said water outlet passage connecting with a said closed chamber, each said closed chamber being substantially larger in size than its respective said water outlet passage, whereby a particle of foreign material that somehow has passed through said water outlet passage will be comfined within said closed chamber and not clog the respective said distribution conduit.

2. The drip irrigation emitter as defined in claim 1 wherein:
each said annular knife edge wall surface being inwardly directed toward its respective said closed chamber, whereby insertion is easily accomplished of a said distribution conduit into a said closed chamber as said wall surface of said conduit readily slides over said annular knife edge wall surface, removal of a said distribution conduit is difficult as the said annular knife edge wall surface is caused to dig into, thereby tightly holding said distribution conduit.

3. The drip; irrigation emitter as defined in claim 2 wherein:
each said valve chamber having a grooved wall surface for the purpose of increasing water flow at times through said chamber for the purpose of purging said valve chamber of sediment and any other foreign material.

4. The drip irrigation emiitter as defined in claim 3 wherein:
each said valve seat being conical.

* * * * *